US009064351B2

(12) United States Patent
Mori et al.

(10) Patent No.: US 9,064,351 B2
(45) Date of Patent: Jun. 23, 2015

(54) DISPLAY CONTROL APPARATUS AND METHOD FOR CONTROLLING THE SAME

(75) Inventors: Kurumi Mori, Kawasaki (JP);
Tomohiro Ota, Kawasaki (JP);
Shuichiro Matsushima, Tokyo (JP);
Tomohiro Yano, Yokohama (JP);
Toshimichi Ise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 414 days.

(21) Appl. No.: 13/301,701

(22) Filed: Nov. 21, 2011

(65) Prior Publication Data

US 2012/0133658 A1 May 31, 2012

(30) Foreign Application Priority Data

Nov. 30, 2010 (JP) .................................. 2010-267217
Aug. 25, 2011 (JP) .................................. 2011-183955

(51) Int. Cl.
*G06T 13/00* (2011.01)
*G06T 13/80* (2011.01)

(52) U.S. Cl.
CPC ...................................... *G06T 13/80* (2013.01)

(58) Field of Classification Search
CPC ......... G06T 13/00; G06T 13/40; G06T 13/80; G06T 13/20; G06T 13/70; G09G 5/00; G06F 17/30274

USPC .......................................... 345/473, 427, 619
See application file for complete search history.

(56) References Cited

U.S. PATENT DOCUMENTS

| 7,927,215 | B2 * | 4/2011 | Sekimori ......................... 463/32 |
| 8,312,374 | B2 * | 11/2012 | Ozawa et al. .................. 715/702 |
| 8,363,019 | B2 * | 1/2013 | Cho et al. ....................... 345/173 |
| 8,549,403 | B2 * | 10/2013 | Sitrick ........................... 715/716 |
| 8,576,235 | B1 * | 11/2013 | Sumner et al. ................ 345/474 |
| 2010/0321406 | A1 * | 12/2010 | Iwase et al. .................... 345/638 |

FOREIGN PATENT DOCUMENTS

JP 2010-061472 A 3/2010

* cited by examiner

*Primary Examiner* — Kimbinh T Nguyen
(74) *Attorney, Agent, or Firm* — Canon USA Inc. IP Division (57) ABSTRACT

A display control apparatus includes a moving image display unit configured to control a display apparatus to display a moving image thereon, a reading unit configured to read animation information including a plurality of frame images, a detection unit configured to detect touch on the display apparatus, and a display control unit configured to control the display apparatus to display a first frame image of the animation information thereon if touch on a specific position of the display apparatus is detected by the detection unit when the moving image is being displayed on the display aparatus, and to start a transition display of frame images of the animation information if the touch on the display apparatus becomes undetected by the detection unit.

12 Claims, 10 Drawing Sheets

DISPLAY CONTROL APPARATUS AND METHOD FOR CONTROLLING THE SAME

BACKGROUND OF THE INVENTION

1. Field of the Invention

The present invention relates to a display control apparatus which is suitably used to provide an animation effect for a captured image, for example, a method for controlling the same, a program, and a storage medium.

2. Description of the Related Art

In a conventional imaging apparatus, a user interface (UI) has been proposed and put into practice in which a video image that is being captured is displayed on a touch panel and a user directly touches a displayed screen to provide various effects for the captured image. Japanese Patent Application Laid-Open No. 2010-61472 discusses a technique by which data are hand-written in the image that is being captured.

However, the technique discussed in Japanese Patent Application Laid-Open No. 2010-61472 attaches importance to processing related to writing or image deformation mainly in a still image, so that a moving animation to be inserted in capturing a moving image is not taken into consideration. For this reason, in a case where a countdown animation, which is inserted in projecting a movie, for example, is inserted acording to the movement of an imaging object, it is difficult to determine timing.

SUMMARY OF THE INVENTION

The present invention is directed to a display control apparatus configured to enable a user to easily insert an animation in a moving image.

According to an aspect of the present invention, a display control apparatus includes a moving image display unit configured to control a display apparatus to display a moving image thereon, a reading unit configured to read animation information including a plurality of frame images, a detection unit configured to detect touch on the display apparatus, and a display control unit configured to control the display apparatus to display a first frame image of the animation information thereon if touch on a specific position of the display apparatus is detected by the detection unit when the moving image is being displayed on the display apparatus, and to start a transition display of frame images of the animation information if the touch on the display apparatus becomes undetected by the detection unit.

According to an exemplary embodiment of the present invention, a timing to start an animation can be easily adjusted to enable the animation to be readily inserted in a moving image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
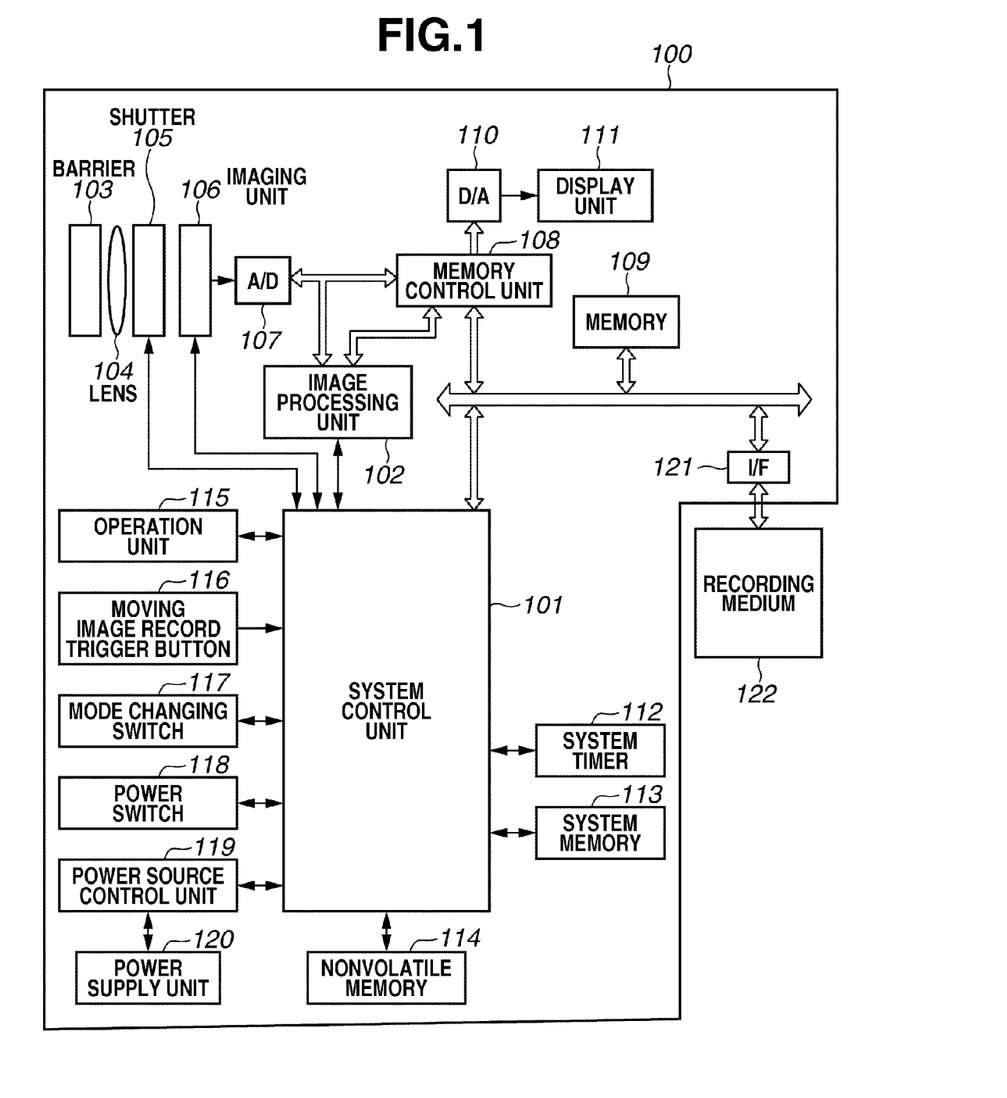
FIG. 1 is a block diagram illustrating an example of an internal configuration of a digital video camera according to a first exemplary embodiment of the present invention.

FIG. 1 is a block diagram illustrating an example of an internal configuration of a digital video camera 100 according to a first exemplary embodiment of the present invention.

In FIG. 1, a photographic lens 104 includes a focus lens. A shutter 105 includes a diaphragm and a neutral density (ND) filter function. An imaging unit 106 includes a charge coupled device (CCD) sensor or a complementary metal-oxide semiconductor (CMOS) sensor which converts an optical image into an electric signal. An A/D converter 107 is used to convert an analog signal output from the imaging unit 106 into a digital signal. A barrier 103 covers the photographic lens 104 and others of the digital video camera 100 to prevent an imaging system, including the photographic lens 104, the shutter 105, and the imaging unit 106, from becoming dirty or being damaged.

An image processing unit 102 subjects data output from the A/D converter 107 or a memory control unit 108 to resize processing, such as pixel interpolation or reduction, or color conversion processing. The image processing unit 102 performs predetermined calculation processing using the captured image data. A system control unit 101 performs exposure control and focusing control based on the acquired calculation result. Thereby, through-the-lens (TTL) auto-focus (AF) processing and automatic exposure (AE) processing are processed. The AE processing controls the shutter speed, the diaphragm, and the ND filter, and the image processing unit 102 controls the gain of an image signal. The image processing unit 102 further performs predetermined calculation processing using the captured image data to perform TTL auto white balance (AWB) processing based on the acquired calculation result.

Usually, the AF, the AE, and the AWB processing are executed in real time in a moving image capturing mode. When the automatic setting of each processing is canceled, each processing can be manually set.

The data output from the A/D converter 107 are directly written in a memory 109 via the image processing unit 102 and the memory control unit 108 or via the memory control unit 108. The memory 109 stores the image data which are acquired by the imaging unit 106 and converted into digital data by the A/D converter 107 and the image data to be displayed on a display unit 111 for displaying still or moving images. The memory 109 has a memory capacity enough to store predetermined moving image and audio data and is used as a memory (a video memory) for displaying an image.

A D/A converter 110 converts data for displaying an image stored in the memory 109 into an analog signal and supplies the analog signal to the display unit 111. Thus, the image data for displaying stored in the memory 109 are output to the display unit 111 via the D/A converter 110, so that an image is displayed on the display unit 111. The display unit 111 performs display on a display device, such as a liquid crystal display (LCD), according to the analog signal output from the D/A converter 110. The digital signal into which an analog signal is converted by the A/D converter 107 and which is stored in the memory 109 is converted into an analog signal by the D/A converter 110, and the analog signal is sequentially transferred to the display unit 111 and displayed thereon, so that the display unit 111 functions as an electronic viewfinder (through image display).

A nonvolatile memory 114 is an electrically erasable/recordable memory and uses an electrically erasable programmable read-only memory (EEPROM), for example. The nonvolatile memory 114 stores constants for operating the system control unit 101 and programs. The program refers to the one that executes various flow charts described below in the present exemplary embodiment. In the present exemplary embodiment, the nonvolatile memory 114 also stores animation information which includes a plurality of frame images continuously transferred to two or more states to be superimposed on a moving image.

The system control unit 101 controls the entire digital video camera 100. The execution of the program stored in the nonvolatile memory 114 realizes each processing in the present exemplary embodiment described below. The system control unit 101 controls the memory 109, the D/A converter 110, and the display unit 111 to perform display control. A system memory 113 uses a random access memory (RAM) to load thereon constants and variables for operating the system control unit 101 and the program read from the nonvolatile memory 114. A system timer 112 is a timing unit for measuring time used for various control operations and time of a built-in timer.

A mode changing switch 117, a moving image record trigger button 116, and an operation unit 115 are operation units used for inputting various operation instructions to the system control unit 101 and switch the operation mode of the system control unit 101 to a moving image record mode or a moving image reproduction mode. Pressing the moving image record trigger button 116 causes the system control unit 101 to start the operation of a series of imaging processing from reading a signal from the imaging unit 106 to writing image data into a recording medium 122.

Various functional icons displayed on the display unit 111 are selected and operated to appropriately allocate functions for each scene to the operation members of the operation unit 115 and the operation members act as various function buttons. The function buttons include an end button, back button, image advancing button, jump button, aperture reducing button, and attribute change button, for example. Pressing a menu button, for example, displays a menu screen whereby to allow various settings on the display unit 111. A user can intuitively perform various settings using the menu screen displayed on the display unit 111, a four directional button, and a SET button.

A power source control unit 119 includes a battery detection circuit, a DC-DC converter, and a switch circuit for switching an energized block and detects whether the battery is installed, the type of the battery, and the remaining battery capacity. The power source control unit 119 controls the DC-DC converter based on the detected result and instructions from the system control unit 101 to supply a required voltage to each unit including the recording medium 122 for a required period of time.

A power supply unit 120 includes a primary battery, such as an alkaline battery or lithium battery, or a secondary battery, such as a NiCd battery, NiMH battery, or Li battery, and an AC adaptor. An interface 121 interfaces with the recording medium 122, such as a memory card or a hard disk. The recording medium 122, such as a memory card, includes a semiconductor memory or a magnetic disk. The recording medium 122 illustrated in FIG. 1 is detachable, but the recording medium may be incorporated in a video camera body. Alternatively, the recording medium 122 may include both of a detachable recording medium and a built-in recording medium.

The operation unit 115 is described below. The digital video camera 100 according to the present exemplary embodiment has a touch panel which can detect touch on the display unit 111 as one of the operation unit 115. The touch panel is integrated with the display unit 111. The touch panel is configured so that light transmissivity does not prevent the display of the display unit 111, and is attached to the upper layer of the display surface of the display unit 111. The input coordinate of the touch panel is associated with the display coordinate of the display unit 111. This allows a graphical user interface (GUI) to be formed as if the user could directly operate the screen displayed on the display unit 111. The touch panel may use any of resistance film, electrostatic capacity, surface acoustic wave, infrared ray, electromagnetic induction, image recognition, and photo sensor touch panels.

The system control unit 101 can detect the following operations given to the touch panel:
1) the touch panel is touched with a finger or a pen (hereinafter referred to as touch-down);
2) the touch panel is kept touched with a finger or a pen (hereinafter referred to as touch-on);
3) a finger or a pen with which the touch panel is touichied is moving (hereinafter referred to as move);
4) a finger or a pen with which the touch panel is touched is separated from the touch panel (hereinafter referred to as touch-up); and
5) nothing touches the touch panel (hereinafter referred to as touch-off).

The system control unit 101 is notified of the above operations and information about a position coordinate where the touch panel is touched with a finger or a pen. The system control unit 101 determines what operation is performed on the touch panel based on the notification information. For the move, the direction in which a finger or a pen moving on the touch panel is moved can also be determined for each vertical or horizontal component on the touch panel based on a change in the position coordinate. When the touch-down is performed and then the touch-up is performed through a constant move on the touch panel, this movement is regarded as drawing a stroke. Hereinafter, the operation of quickly drawing a stroke is referred to as flick. The flick is an operation in which a finger touching the touch panel is quickly moved by a certain amount of distance and then separated from the touch panel. In other words, the flick is an operation which quickly traces the touch panel as if the touch panel was flicked. If it is detected that the move is performed over a predetermined distance or longer at a predetermined speed or higher and the touch-up is then detected, it is determined that the flick is performed. If it is detected that the move is performed over the predetermined distance or longer at a speed lower than the predetermined speed, it is determined that drag is performed.

A method for inserting an animation for enhancing an image effect is described below. In the digital video camera 100 according to the present exemplary embodiment, the user can input an animation using a touch panel being one of the operation unit 115. With the user interface (UI) displayed on the display unit 111 as an example, the procedure for superimposing an animation on an image is described below with reference to FIGS. 2A to 2D and FIGS. 3A to 3O.

Figure 2A:
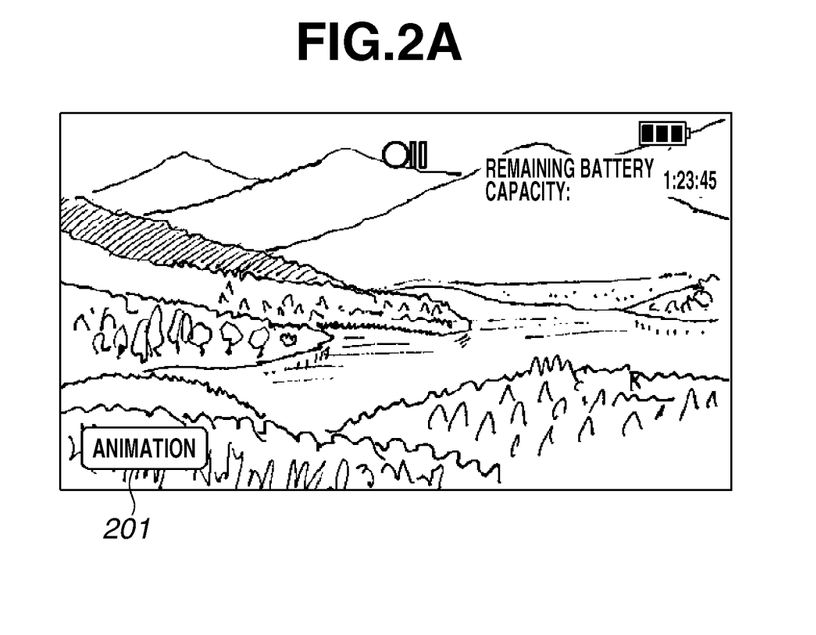
FIGS. 2A to 2D illustrate examples of a through image and an animation image to be displayed.

FIG. 2A illustrates an example of an image (a through image) displayed during an imaging standby period or an imaging period (during a moving image record period) in the normal imaging mode. In FIG. 2A, a button 201 can be used to select a function of superimposing an animation. Touching the button 201 transfers the screen to a screen illustrated in FIG. 2B.

Figure 2B:
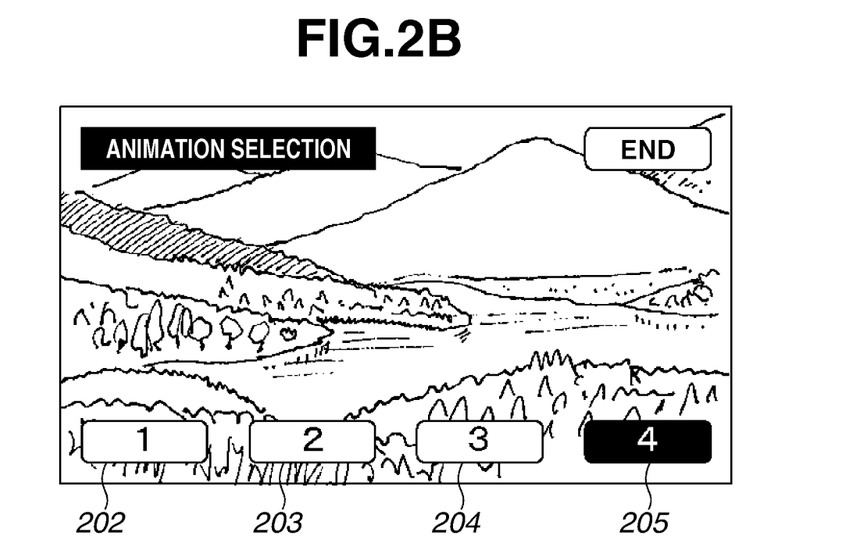

FIG. 2B illustrates an example of a screen used for selecting animations to be superimposed. Selection buttons 202 to 205 illustrated in FIG. 2B are used for selecting animations. The election button 205, whose color is changed, indicates that the selection button 205 is selected. In this state, the user touching the portion of a through image (i.e., an area excluding the areas of the selection buttons 202 to 205) transfers the screen to a screen illustrated in FIG. 2C.

Figure 2C:
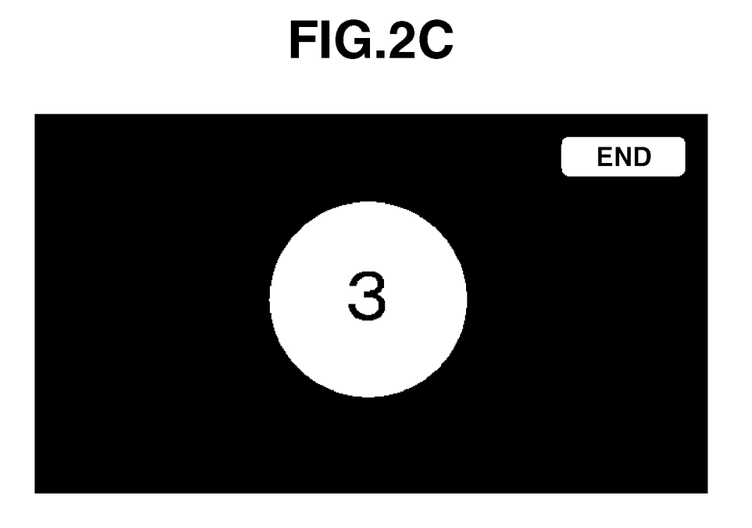
Figure 2D:
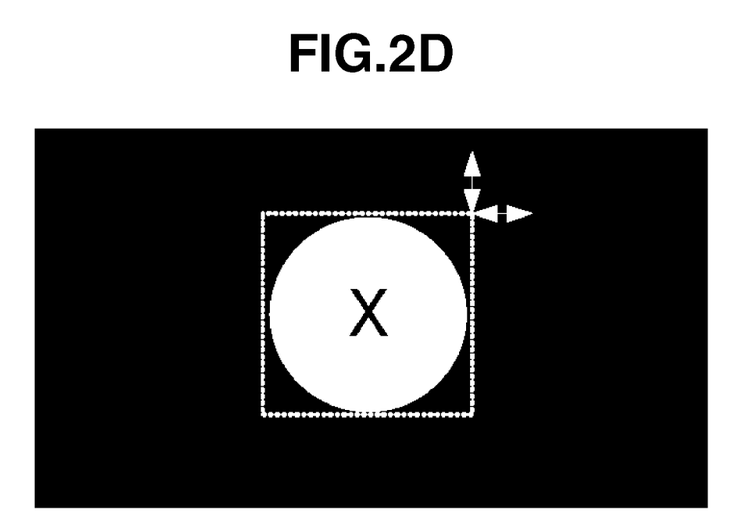
Figure 3A:
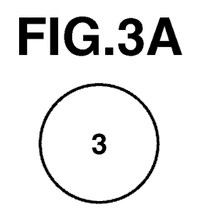
FIGS. 3A to 3O illustrate examples of a countdown animation image.

FIG. 2C illustrates a first state of the animation selected in the screen illustrated in FIG. 2B (a state of displaying a first frame image). FIG. 2C illustrates the screen in which a figure (a first frame image) illustrated in FIG. 3A is superimposed on a black background. As illustrated in FIG. 2D, the user randomly touching a fixed area upward, downward, leftward, and rightward reproduces a state of reproduction of an old film in a pseudo manner. As long as the user continues the touch-on, the animation keeps the state of the screen illustrated in FIG. 2C.

Figure 3B:
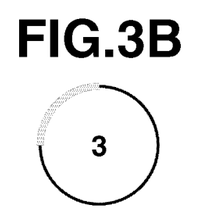
Figure 3C:
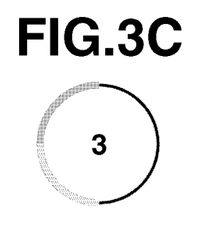
Figure 3D:
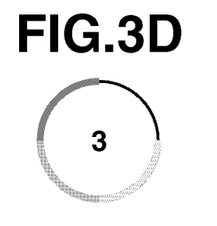
Figure 3E:
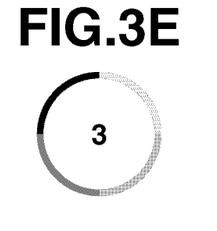
Figure 3F:
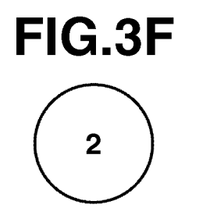
Figure 3G:
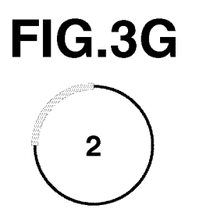
Figure 3H:
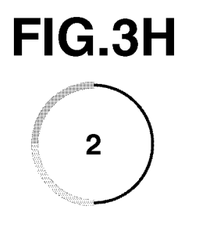
Figure 3I:
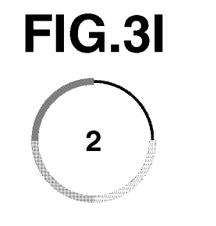
Figure 3J:
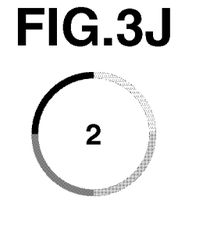
Figure 3K:
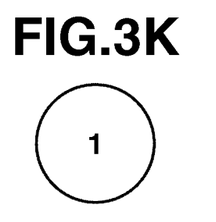
Figure 3L:
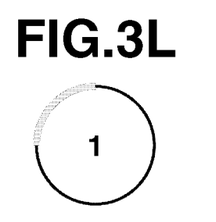
Figure 3M:
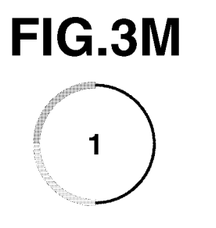
Figure 3N:
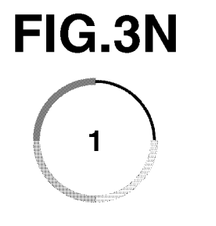
Figure 3O:
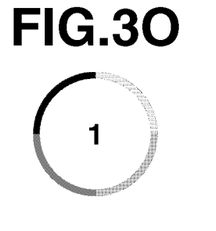

If the user performs the touch-up, the transition display of frame images is started and the screen is changed in the order illustrated in FIGS. 3B to 3O at a fixed time interval. More specifically, the frame image is changed from the first frame image in FIG. 3A to the second frame image in FIG. 3B, the third frame image in FIG. 3C, . . . , and the fifteenth frame image in FIG. 3O. FIGS. 3A to 3O illustrate only the center portion of the screen. The center portion of the screen is displayed on a black background as illustrated in FIG. 2C. At this point, a random movement is also performed at the same time as illustrated in FIG. 2D and a countdown animation is performed. When the animation is ended, the screen is returned to the screen illustrated in FIG. 2B and rendered to an animation standby state.

If a moving image is not being recorded at the timing at which the touch-up is performed (i.e., if imaging is on a standby state before the touch-up), recording is started in synchronization with the touch-up, and the countdown animation is inserted in an initial portion of the moving image to be recorded. The user may set whether to start recording the moving image in synchronization with the touch-up according to the operation of the user with a setting menu previously displayed.

When the screen is touched again while the state of the animation is being transferred (transition display), the screen is returned to the screen illustrated in FIG. 2C. The touch-up thereafter resumes transferring the animation illustrated in FIGS. 3A to 3O. The image on which the animation is superimposed and which is recorded previously at the timing at which a screen is transferred again to the screen illustrated in FIG. 2C is deleted, and recording is then started again by the touch-up.

Figure 9:
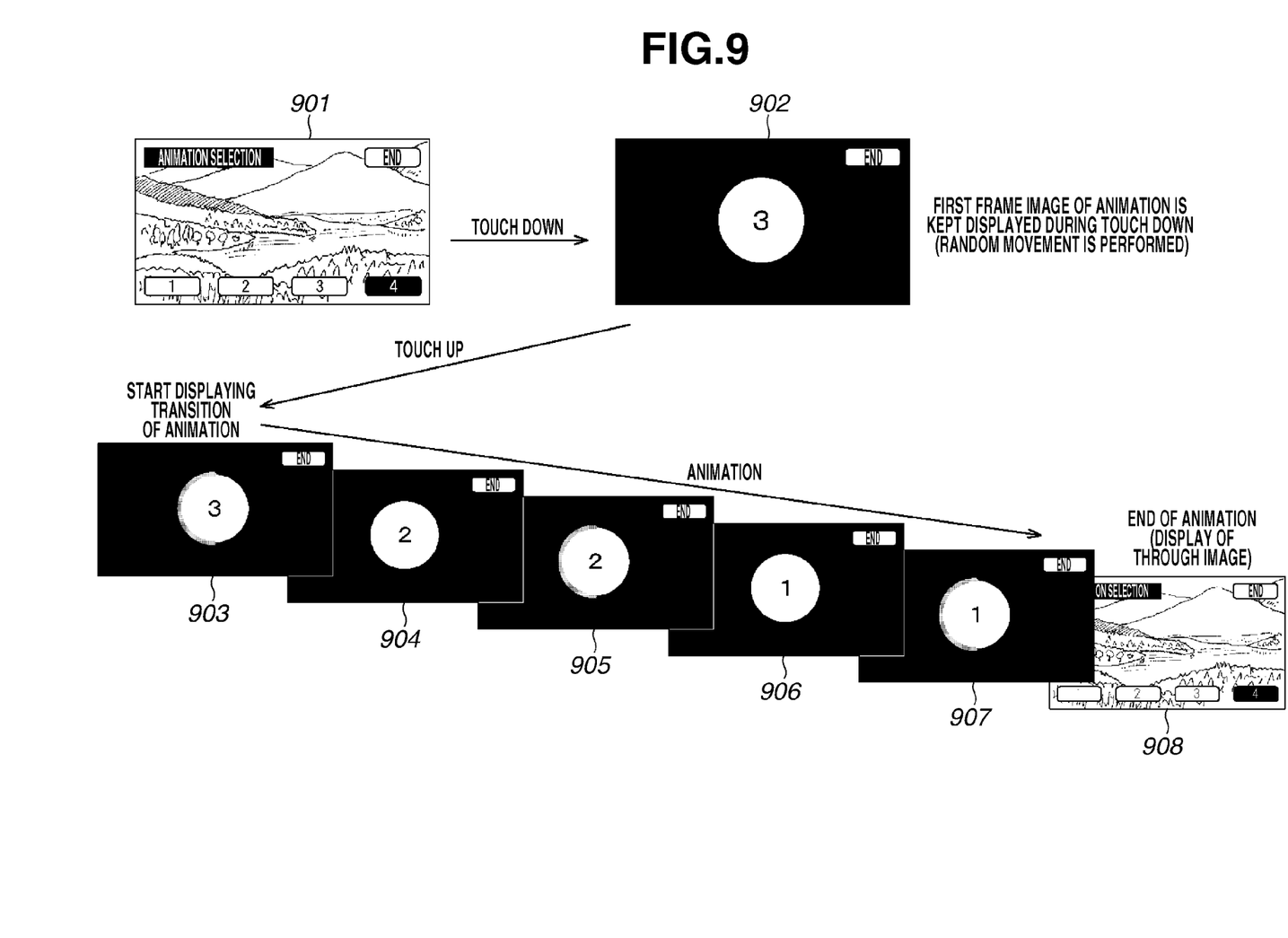
FIG. 9 is a schematic diagram illustrating a state of the transition of display related to the insertion of the animation.

FIG. 9 is a schematic diagram illustrating a state of the transition of display related to the insertion of the above animation. A screen 901 is the same as the screen illustrated in FIG. 2B. When the touch-down on the through screen is detected at the screen, a screen 902 is displayed. The screen 902 is the same as the screen illustrated in FIG. 2C. This display state is continued during the touch-on after the touch-down (however, a random movement is made upward, downward, leftward, and rightward to a fixed area). When the touch-up is detected in the state of the screen 902, the transition display of the animation is started. Display is transferred to a screen 903, a screen 904, a screen 905, a screen 906, and a screen 907 in this order. When the animation is ended, a through image as illustrated in a screen 908 is kept displayed. The screens 903, 904, 905, 906, and 907 are displayed corresponding to FIGS. 3C, 3F, 3H, 3K, and 3M, respectively. Although there is a different display transition among the screens 902, 903, 904, 905, 906, 907, and 908, the illustration thereof is omitted.

Figure 4:
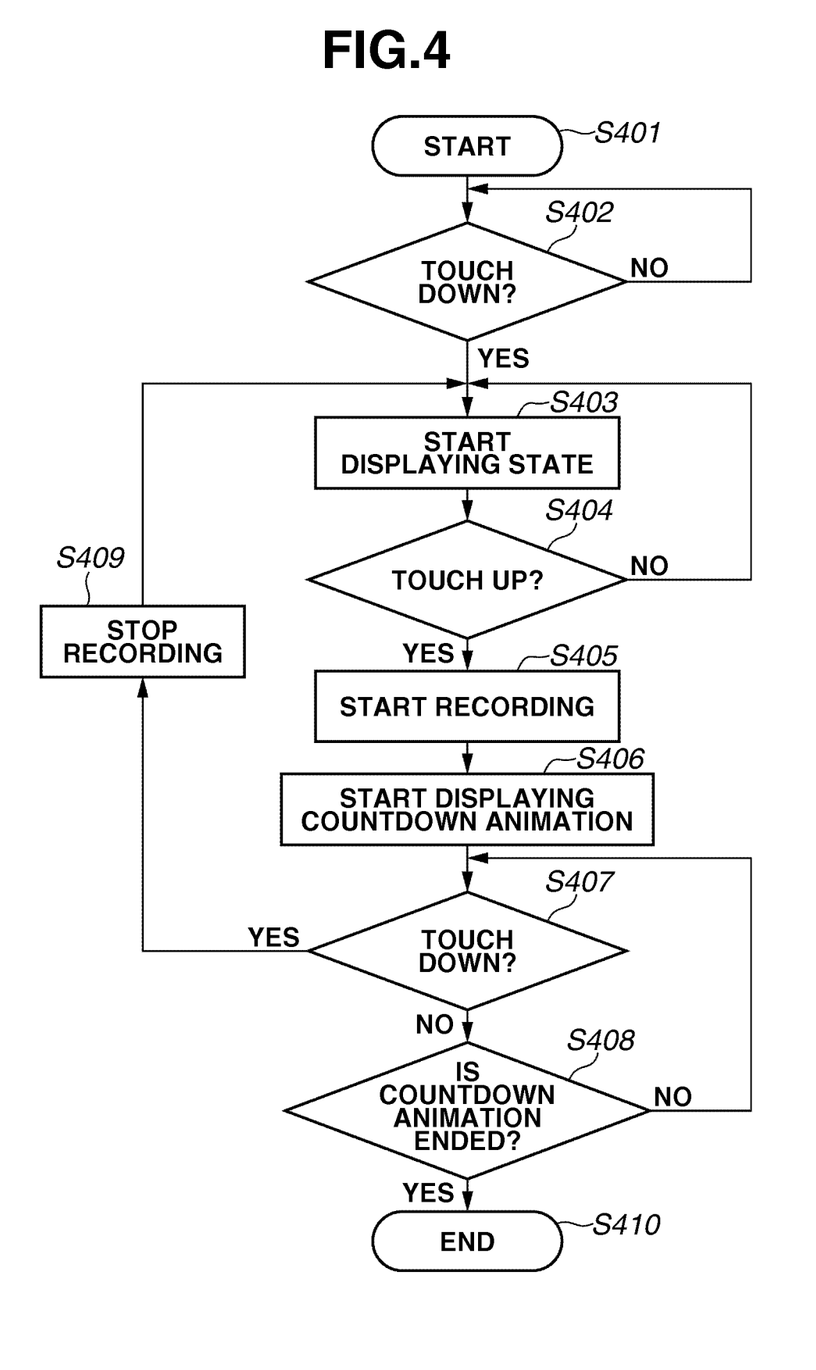
FIG. 4 is a flow chart illustrating an example of a procedure for superimposing the animation in the first exemplary embodiment.

FIG. 4 is a flow chart illustrating an example of a procedure for superimposing the animation in the present exemplary embodiment. The processing illustrated in FIG. 4 is realized by loading the program recorded in the nonvolatile memory 114 onto the system memory 113 and by the system control unit 101 executing the program.

In step S401 in FIG. 4, processing is started when a though image as illustrated in FIG. 2B is displayed on the display unit 111. In step S402, the system control unit 101 waits until the touch-down is performed on the touch panel of the display unit 111. If the system control unit 101 detects that the touch-down is performed (YES in step S402), then in step S403, the system control unit 101 reads the associated animation information from the nonvolatile memory 114 to display the first frame image of the animation. The display is processing for keeping a display state illustrated in FIG. 2C. At this point, the random movement illustrated in FIG. 2D is started at the same time.

The frame image does not necessarily need to be an exact first frame image, but another frame image may be displayed provided that the image can be identified as the frame image before the start of transition display of the animation. For example, in a case where the first frame image is substantially similar to the second frame image among a plurality of frame images included in the animation information, a state where the second frame image is displayed may be kept. A frame image different in color to be displayed only when the touch-down is detected is prepared to cause the user to identify that the touch-down is received. The frame image different in color is displayed only in the touch-down. Thereafter, in the touch-on, the frame image which is the same in color as the frame image used in the transition display of the animation may be displayed and kept.

In step S404, the system control unit 101 determines whether the touch-up is performed. If the system control unit 101 does not detect that the touch-up is performed (NO in step S404), the touch-on is continued, so that the processing returns to step S403. The system control unit 101 continues displaying the first frame image of the animation. If the system control unit 101 detects that the touch-up is performed (YES in step S404), then in step S405, the system control unit 101 starts recording a moving image on which the animation is superimposed.

In step S406, the system control unit 101 starts displaying the countdown animation illustrated in FIGS. 3B to 3O. In other words, the system control unit 101 starts the transition display (animation) of the frame images illustrated in FIGS. 3B to 3O subsequent to the first frame image. In step S407, the system control unit 101 determines whether the touch-down is performed again on the screen. If the system control unit 101 does not detect that the touch-down is performed (NO in step S407), then in step S408, the system control unit 101 determines whether all of the steps for the display of the countdown animation are ended. If the system control unit 101 determines that all of the steps are ended (YES in step S408), then in step S410, the system control unit 101 ends the processing for superimposing the animation. In this case, the moving image on which the animation is superimposed and which is recorded as moving image data on the recording medium 122 until then is not deleted, and, subsequently, the recording of a moving image without the animation is continued. If the system control unit 101 determines that not all of the steps are ended (NO in step S408), the processing returns to step S407.

If the system control unit 101 detects that the touch-down is performed (YES in step S407), then in step S409, the system control unit 101 stops recording the moving image. In step S409, the system control unit 101 deletes the moving image recorded from step S405 where the recording is started to the touch-down and stops recording. Thereafter, the processing returns to step S403.

According to the present exemplary embodiment, the touch-up and the touch-down are operated to issue instructions for the insertion of the animation. This allows timing to be easily corrected if the timing at which the animation is started is incorrect and allows the unnecessary recording data before correction to be automatically deleted.

A second exemplary embodiment of the present invention is described below. In the present exemplary embodiment, recording is started by the user performing the touch-up to record, as recording data, both of a moving image on which the animation is superimposed and a moving image on which the animation is not superimposed. If the animation display is ended as it is, the moving image on which the animation is not superimposed is deleted. If the touch-down is performed while the animation is being displayed, the moving image on which the animation is superimposed is deleted. Other than those above, the configuration and display screen of the digital video camera according to the present exemplary embodiment are similar to those in FIG. 1 to FIGS. 3A to 3O described in the first exemplary embodiment, so that the description thereof is not repeated.

Figure 5:
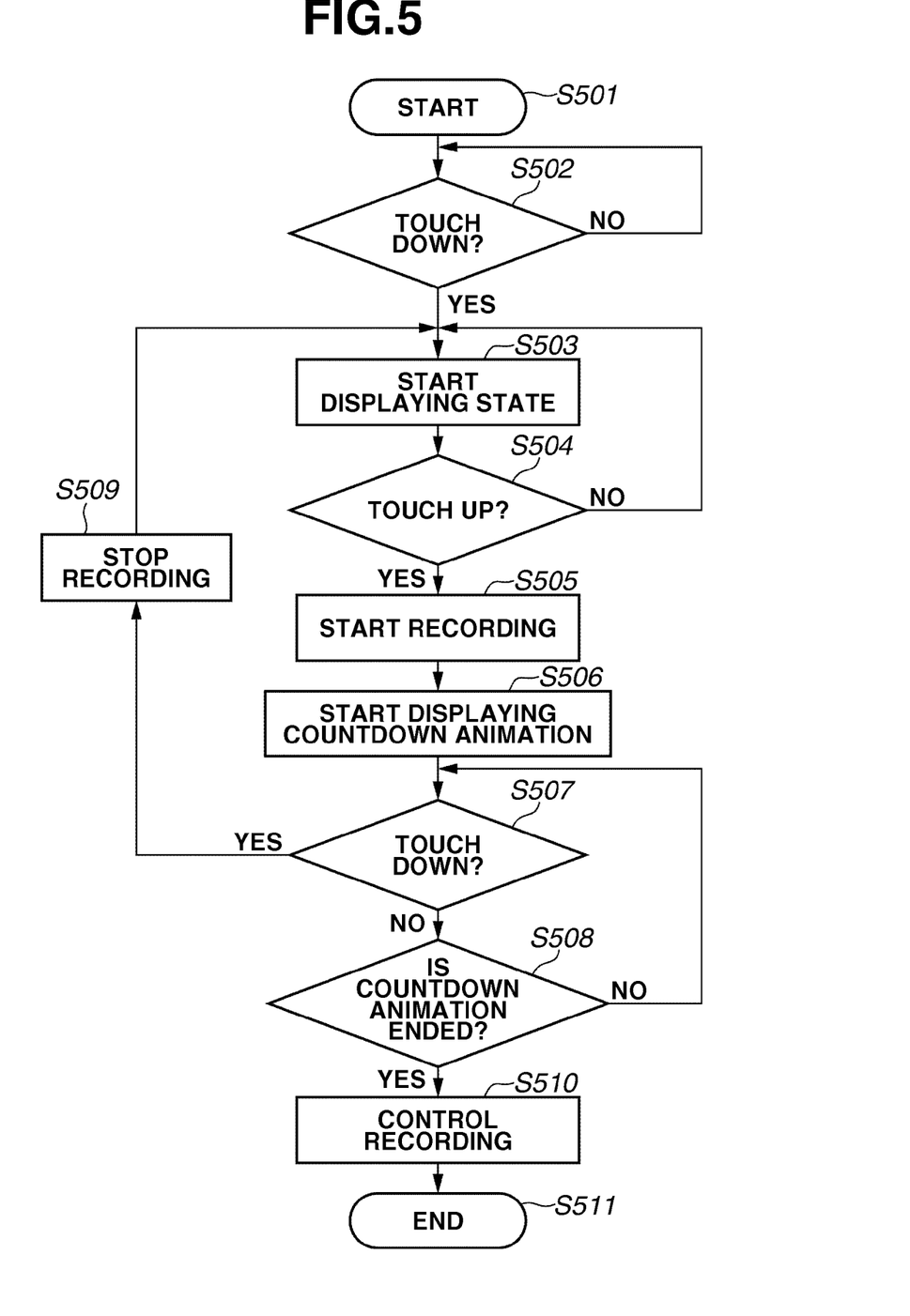
FIG. 5 is a flow chart illustrating an example of a procedure for superimposing the animation in a second exemplary embodiment of the present invention.

FIG. 5 is a flow chart illustrating an example of a procedure for superimposing the animation in the present exemplary embodiment. The processing illustrated in FIG. 5 is realized by loading the program recorded in the nonvolatile memory 114 onto the system memory 113 and by the system control unit 101 executing the program.

In FIG. 5, steps S501 to S504 are similar to steps S401 to S404 in FIG. 4, respectively. In step S505, if the screen is in a record pause state (in an imaging standby state) since earlier than step S502, the system control unit 101 starts recording, as recording data, both of a moving image on which the animation is superimposed and a moving image on which the animation is not superimposed. If the screen is in a moving-image recording state (in a moving-image capture state) since earlier than step S502, the system control unit 101 continues recording a moving image on which the animation is not superimposed and starts recording a moving image on which the animation is superimposed in parallel.

Steps S506 to S508 are similar to steps S406 to S408 in FIG. 4, respectively. In step S509, if both of the moving image on which the animation is superimposed and the moving image on which the animation is not superimposed are recorded at the same time, the system control unit 101 stops recording only the moving image on which the animation is superimposed and deletes the stopped moving image. The system control unit 101 continues recording the moving image on which the animation is not superimposed.

In step S510, the system control unit 101 stops recording only the moving image on which the animation is superimposed. If the moving image on which the animation is not superimposed and the moving image on which the animation is superimposed are recorded, the system control unit 101 deletes the moving image on which the animation is not superimposed in the time range in which the moving image on which the animation is superimposed exists and connects the moving image on which the animation is superimposed to the deleted portion. The system control unit 101 continues recording the moving image on which the animation is not superimposed as a portion continuing to the moving image.

As described above, according to the present exemplary embodiment, even if the timing at which the animation is started is incorrect in the normal recording processing, the timing can be easily corrected. Furthermore, even if the timing at which the animation is started is incorrect at the time of starting the recording processing, the moving image on which the animation is not superimposed (an object image) is recorded in parallel and a moving image capturing operation can be continued with the incorrect portion as the moving image without the animation. This prevents failing to capture an image.

In the first and second exemplary embodiments, the display in steps S403 and S503 in FIGS. 4 and 5, respectively, and the countdown animation started in steps S406 and S506 in FIGS. 4 and 5, respectively, use black as a background as described in the example illustrated in FIG. 2C. While the moving image recorded in the recording medium 122 uses black as a background as described above, only the video image displayed on the display unit 111 may use the following display form to make it easier to decide on the timing.

Figure 6:
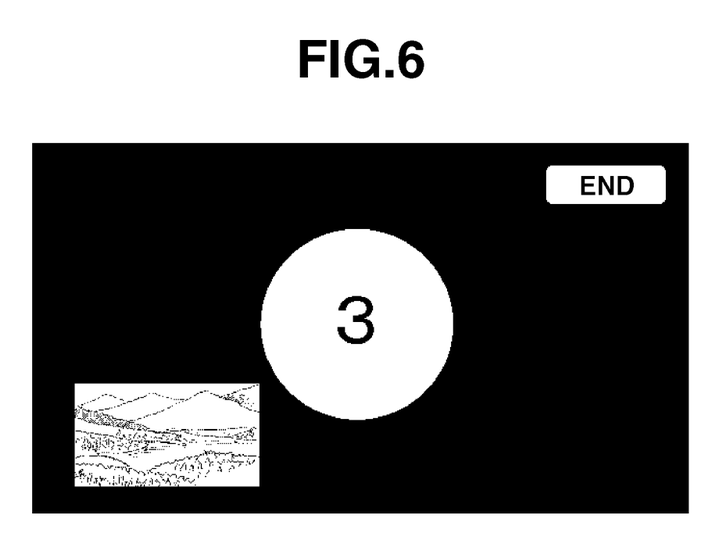
FIG. 6 illustrates an example of a screen in an animation standby state.

For example, the display in an animation standby state illustrated in FIG. 2C may be changed to a screen illustrated in FIG. 6. As illustrated in FIG. 6, the display of a reduced image of a through image on the screen allows the confirmation of a state of a real image hidden behind the animation and makes it easier to decide on the timing at which the animation is started.

Figure 7:
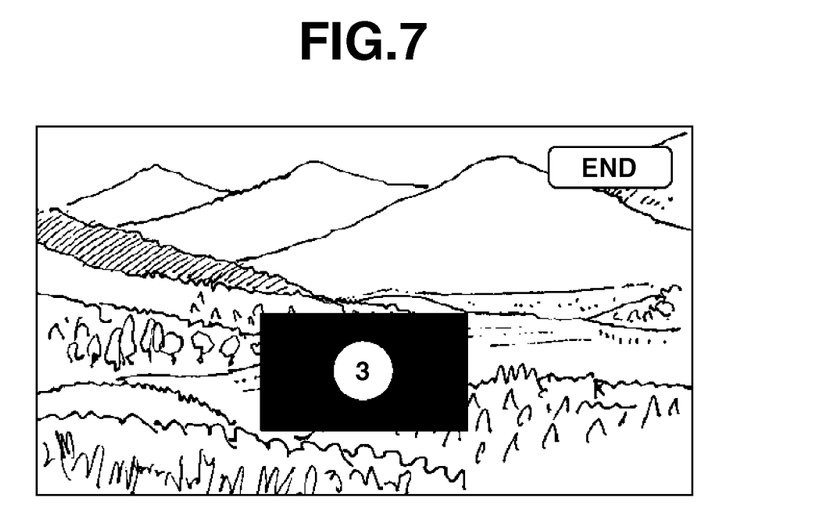
FIG. 7 illustrates an example of a screen in an animation standby state.

Alternatively, the display in an animation standby state illustrated in FIG. 2C may be changed to a screen illustrated in FIG. 7. As illustrated in FIG. 7, the display of a reduced image of the animation on the through image ensures the visibility of an image to be captured and makes it easier to decide on the timing at which the animation is started.

Figure 8:
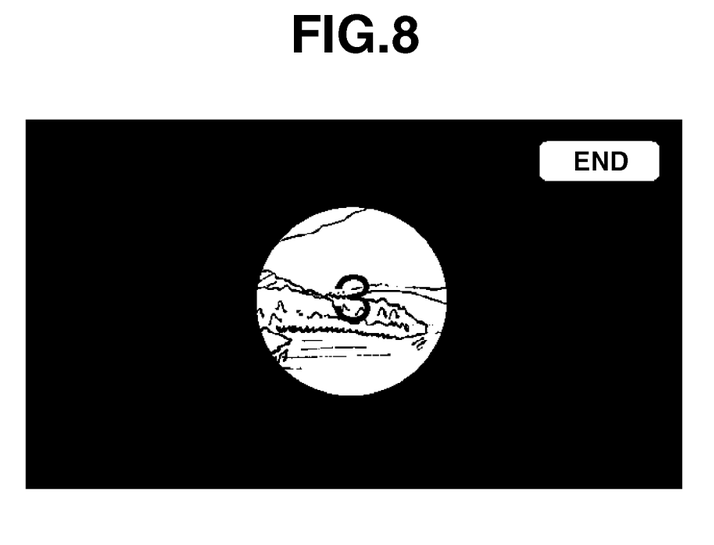
FIG. 8 illustrates an example of a screen in an animation standby state.

Still alternatively, the display in an animation standby state illustrated in FIG. 2C may be changed to a screen illustrated in FIG. 8. As illustrated in FIG. 8, a portion of the image used for the animation is made transparent to allow the confirmation of a portion of the captured image being a background, making it easier to decide on the timing at which the animation is started.

The system control unit 101 can be controlled by one hardware, or a plurality of hardware shares the processing to control the entire apparatus. The present invention has been described above based on the exemplary embodiments. However, the present invention is not limited to the specific exemplary embodiments, but includes various embodiments made within the scope not departing from the gist of the present invention. The above-mentioned exemplary embodiments merely show an exemplary embodiment of the present invention. The exemplary embodiments may be appropriately combined together.

In the aforementioned exemplary embodiments, there is described an example of the case where the present invention is applied to a digital video camera. However, the present invention is not limited to the example, but applicable also to a display control apparatus capable of inserting information accompanied by an animation into a moving image. In other words, although the aforementioned exemplary embodiments describe the example where animation information is superimposed on the moving image which is being captured, the present invention is also applicable to the case where animation information is inserted into the already captured moving image or a moving image produced by an apparatus other than an imaging apparatus as a part of moving image editing. More specifically, the present invention is applicable to a personal computer, personal digital assistant (PDA), cellular phone handset, portable image viewer, printer with a display, digital photo frame, music player, game machine, and electronic book reader.

The present invention is also realized by executing the following processing. The processing is performed such that software (program) realizing the functions of the exemplary embodiments is supplied to a system or apparatus via a network or various storage media, and the computer (or CPU or MPU) of the system or the apparatus reads and executes program code. In this case, the program and a computer readable storage medium storing the program constitute the present invention.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-267217 filed Nov. 30, 2010 and No. 2011-183955 filed Aug. 25, 2011, which are hereby incorporated by reference herein in their entirety.

What is claimed is:

1. A display control apparatus comprising:
    a moving image display unit configured to control a display apparatus to display a moving image thereon;
    a reading unit configured to read animation information, different from the moving image, including a plurality of frame images;
    a detection unit configured to detect touch on the display apparatus; and
    a display control unit configured to control the display apparatus:
        (a) to display a first frame image of the animation information in a display area where the moving image is being displayed in response to detecting touch on a specific position of the display apparatus by the detection unit when the moving image is being displayed on the display aparatus,
        (b) to keep a display of frame images of the animation information without starting a transition display of frame images of the animation information while the touch on the display apparatus which caused the first frame image of the animation information to be displayed is being detected, and
        (c) to start a transition display of frame images of the animation information in response to detecting, by the detection unit, that the touch on the display apparatus which caused the first frame image of the animation information to be displayed is released.

2. The display control apparatus according to claim 1, further comprising a recording unit configured to record, as moving image data, the moving image into which the animation information is inserted on a recording medium in response to starting of the transition display of frame images of the animation information.

3. The display control apparatus according to claim 1, wherein the display control unit returns to displaying of the first frame image of the animation information if the touch on the display apparatus is detected again while the transition display is being performed, and resumes the transition display of frame images of the animation information if the touch on the display apparatus becomes undetected again by the detection unit.

4. The display control apparatus according to claim 2, wherein, if the touch on the display apparatus is detected again while the transition display is being performed, the recording unit deletes moving image data that is recorded until the touch is detected again from the recording medium.

5. The display control apparatus according to claim 2, wherein, if the touch on the display apparatus is detected again while the transition display is being performed, the recording unit deletes moving image data that is related to a moving image into which the animation information is inserted and that is recorded until the touch is detected again from the recording medium, but does not delete moving image data that is related to a moving image into which the animation information is not inserted and that is recorded until the touch is detected again.

6. The display control apparatus according to claim 1, wherein, when the first frame image of the animation information is displayed, the display control unit displays a reduced image of the moving image together with the first frame image on the display apparatus.

7. The display control apparatus according to claim 1, wherein, when the first frame image of the animation information is displayed, the display control unit displays the first frame image of the animation information while superimposing the first frame image on the moving image in a state in which a portion of the first frame image is made transparent on the display apparatus.

8. The display control apparatus according to claim 1, wherein the specific position includes a position where the moving image is displayed in the display apparatus.

9. The display control apparatus according to claim 1, wherein the specific position includes a position other than an area where a button operable for a touch operation is displayed in the display apparatus.

10. The display control apparatus according to claim 1, further comprising an imaging unit configured to capture a moving image,
    wherein the moving image displayed by the moving image display unit includes an image captured by the imaging unit.

11. A method for controlling a display control apparatus, the method comprising:
    controlling a display apparatus to display a moving image thereon;

reading animation information, different from the moving image, including a plurality of frame images;

detecting touch on the display apparatus; and performing control to:

(a) display a first frame image of the animation information in a display area where the moving image is being displayed in response to detecting touch on a specific position of the display apparatus, (b) keep a display of frame images on the animation information without starting a transition display of frame images of the animation information while the touch on the display apparatus which caused the first frame image of the animation information to be displayed is being detected, and (c) start a transition display of frame images of the animation information in response to detecting, the touch on the display apparatus which caused the first frame image of the animation information to be displayed is released.

12. A non-transitory computer-readable storage medium storing a program for causing a computer to function as each unit of the display control apparatus according to claim 1.

* * * * *